United States Patent [19]

Holz

[11] Patent Number: 4,832,669
[45] Date of Patent: May 23, 1989

[54] TAB AND RECESS LAGGING SEGMENT FOR PULLEY AND METHOD OF MOUNTING THE SAME

[76] Inventor: William G. Holz, 105 S. Washington St., Lodi, Calif. 95240

[21] Appl. No.: 31,418

[22] Filed: Mar. 30, 1987

[51] Int. Cl.$^4$ ............................................. F16H 55/48
[52] U.S. Cl. .................................... 474/185; 198/842; 474/191
[58] Field of Search ............................... 474/184–191; 198/835, 842, 843; 29/458, 159 R, 121.1, 121.2, 120; 228/152, 170, 171

[56] References Cited

U.S. PATENT DOCUMENTS

| | | | |
|---|---|---|---|
| 3,354,735 | 11/1967 | Holz | 474/185 |
| 3,789,682 | 2/1974 | Holz | 474/185 |
| 4,138,011 | 2/1979 | Lapeyre | 198/842 X |
| 4,284,409 | 8/1981 | Van Teslaar | 474/185 |

Primary Examiner—Thuy M. Bui
Attorney, Agent, or Firm—Glen R. Grunewald; Thomas R. Lampe

[57] ABSTRACT

A lagging segment having a leading edge in the form of tabs and recesses and a trailing edge in the form of tabs and recesses whereby adjacent segments can be welded to the face of a pulley without damaging elastomer by placing adjacent segments around the face of a pulley with the tabs of the leading edge positioned within the recesses of the trailing edge of adjacent segments and spaced with an air space between the tabs and recesses of adjacent segments such that welds at the ends of the tabs are separated by a heat insulating air space from the recess of the adjacent segment, whereby the spacing between the elastomer portions of adjacent segments is diminished.

8 Claims, 2 Drawing Sheets

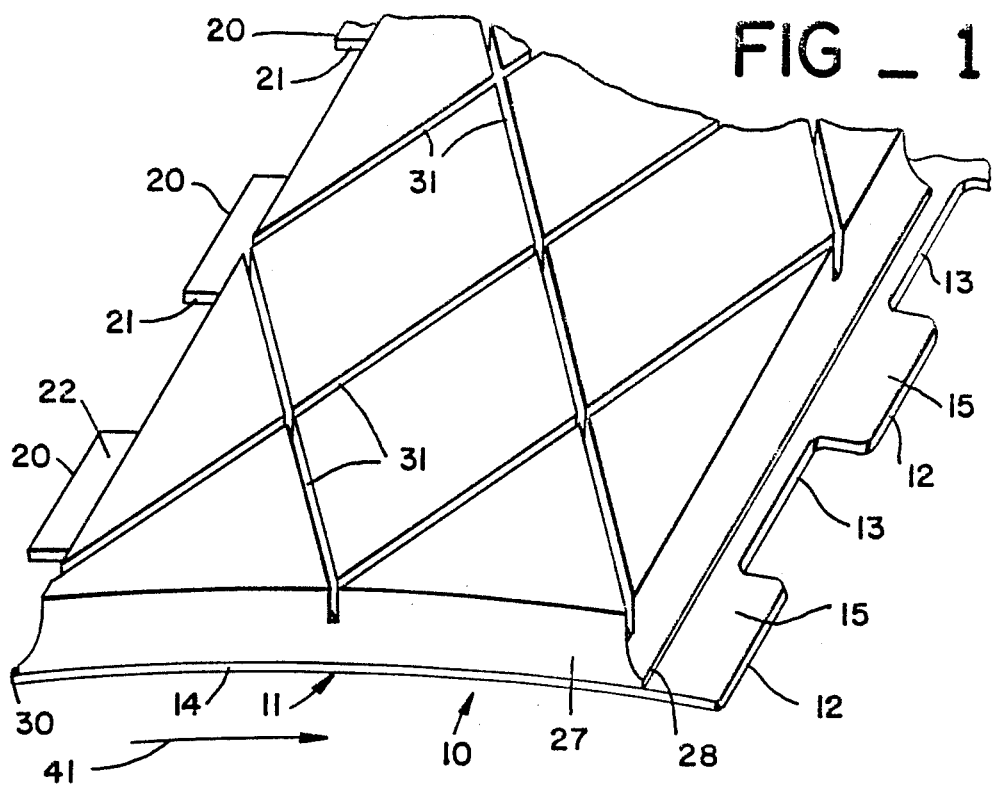
FIG_1
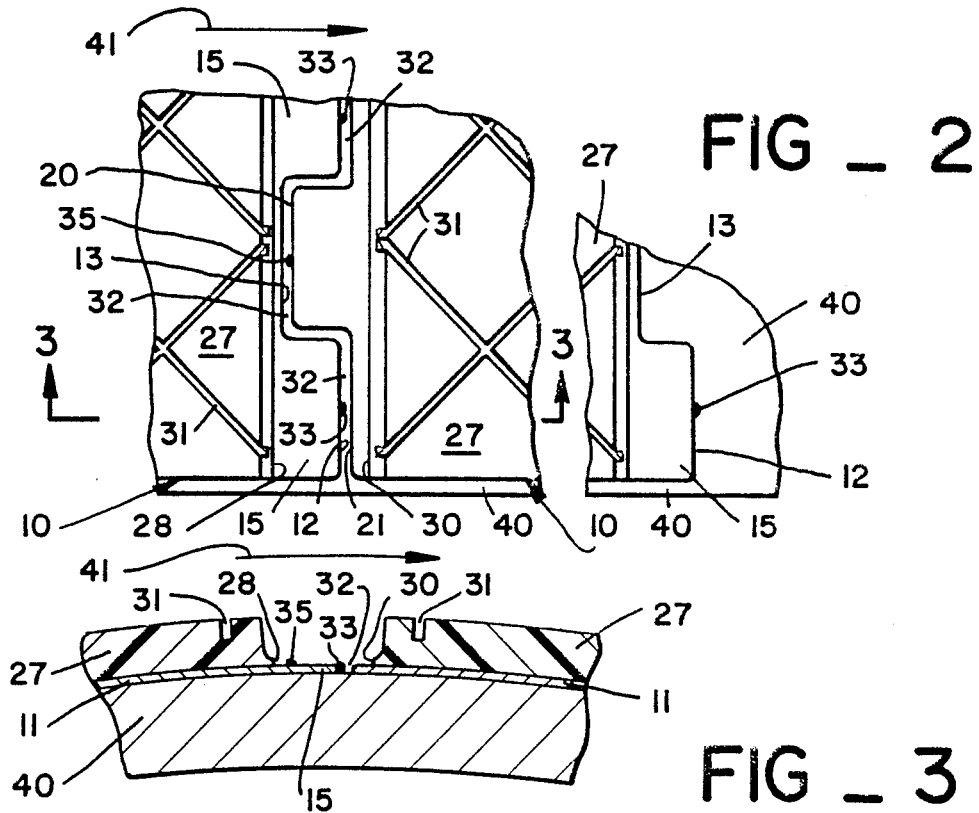
FIG_2
FIG_3

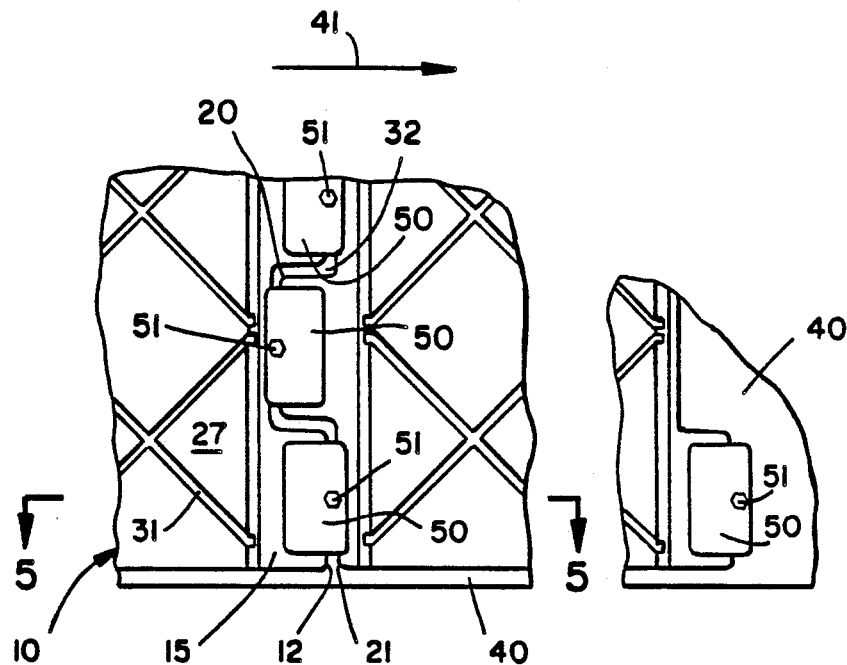
FIG_4
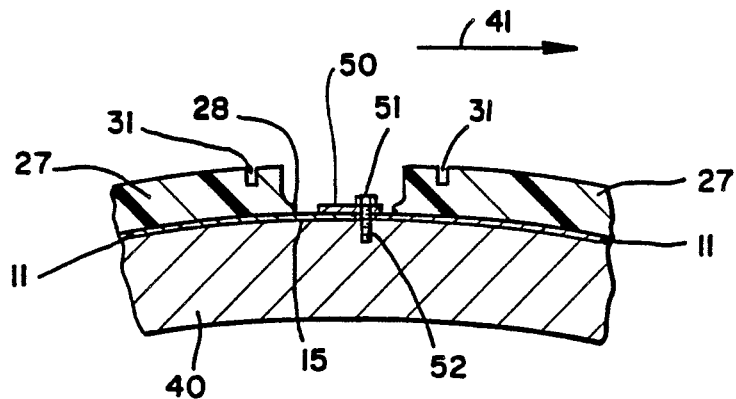
FIG_5

TAB AND RECESS LAGGING SEGMENT FOR PULLEY AND METHOD OF MOUNTING THE SAME

TECHNICAL FIELD

This invention is in the field of lagging for pulley wheels used with conveyor belts, rollers, idlers and the like.

BACKGROUND ART

Conveyor belts are supported and driven by pulleys. Some pulleys are drive pulleys while others are idler pulleys or support pulleys. In order to reduce belt wear and to provide good traction between the pulleys and the belt, the pulley surface is covered with lagging, which is usually elastomeric material applied to the cylindrical surface of the pulley. Lagging increases belt life by eliminating slippage and it can be employed to promote belt alignment.

Originally rubber lagging was bonded to the face of the pulley. A pulley needing its lagging replaced was taken out of service and subjected to a process where old lagging was stripped from the face of the pulley and new lagging bonded to it. Lagging in the form of tires was developed so that the stripping and bonding process could be avoided by forcing a tire around the face of the pulley that fit tightly enough so that it would not slip with respect to the pulley face when it was in use. Whether using a bonding technique or a tire, it was necessary to take the pulley out of service, remove it from the conveyor system and replace it after new lagging had been installed. During the time lagging was being replaced the conveyor system was out of service.

Segmented lagging was latter developed. Segmented lagging involved a number of distinct lagging segments that could be attached to a pulley face by clamps or by welding. Segmented lagging was a great improvement because the lagging on a pulley face could be replaced without removing the pulley from the conveyor system or even removing the belt from the pulley. The portion of the pulley surface not in contact with a belt could have its old lagging removed and new lagging installed by replacing lagging segments one at a time. Segmented lagging is made by bonding elastomer to a metal plate and it is installed by connecting the metal plate to the pulley surface. U.S. Pat. No. 3,789,682 discloses such lagging segments and how they are attached to pulleys.

A preferred way of installing segmented lagging is to spot weld the metal plate portion of the lagging segment to the pulley face. However, the heat of welding can destroy the elastomer or the bond between the elastomer and the metal so it is necessary to have the metal plate extend far enough from the elastomer so that heat is dissipated between the point of the weld and the point of the elastomer bond to the metal plate. Generally, the metal must extend about 25 mm from the elastomer before welding can be accomplished without damaging the elastomer. Accordingly, two adjacent lagging segments attached to a pulley face by welding will have a 50 mm gap between the elastomer portions of the two adjacent segments. To eliminate belt wear and improve traction it is desirable to reduce the gap between the belt-contacting elastomer portions of adjacent lagging segments.

Another way to install lagging segments is to clip them to the face of the pulley as disclosed in U.S. Pat. No. 3,789,682. The portion of the lagging held between the clips and the pulley face is a portion of the metal plate extending beyond the elastomer part of the lagging and the distance between the elastomer portions of two adjacent lagging segments is twice the length of these extensions plus the space between them used by the clips. This distance is also at least 50 mm and this spacing also causes the problems mentioned above.

DISCLOSURE OF THE INVENTION

This invention is a lagging segment and method for installation that is attachable to a pulley face with close spacing between the elastomer portions of adjacent segments. The space between elastomer portions of adjacent segments of this invention can be approximately half of the space between elastomer portions of segments known to the art, yet, the elastomer of segments of this invention are not damaged by welding heat when they are attached by welding.

The segments of this invention are made with leading edges and trailing edges that have recesses positioned and sized so that the edges are in the form of a series of alternating protrusions and recesses. The recesses in the trailing edges are positioned to correspond with the protrusions of the leading edges so that the protrusions of the leading edges of one segment can lie within the recesses of the trailing edges of an adjacent segment. Segments made in accordance with this invention are mounted on a pulley face with an air space between each protrusion and its corresponding recess and welded at the ends of the protrusions whereby destructive welding heat is dissipated as it is conducted through the protrusions toward the elastomer. Welds positioned close to the elastomer within the recess are separated from the metal of the next adjacent segment by an air space which is a very poor conductor of heat thereby protecting the closely spaced elastomer from heat damage.

Segments made in accordance with this invention can be mounted between the pulley face and a row of short clips, specifically, clips that fit in the recesses of an edge and hold the protrusions of the adjacent edge and are held to the pulley face by mechanical means, such as bolts extending through the air space.

BRIEF DESCRIPTION OF THE DRAWINGS

FIG. 1 is a partial perspective view of a lagging segment embodying this invention.

FIG. 2 is a partial plan view of two lagging segments as illustrated in FIG. 1 mounted on a pulley face.

FIG. 3 is a cross-section of the lagging segments illustrated in FIG. 2 taken along the plane of the line 3—3 in FIG. 2.

FIG. 4 is a partial plan view of two lagging segments illustrating another embodiment of the invention.

FIG. 5 is a cross-section of the lagging segments illustrated in FIG. 4 taken along the plane of the line 5—5 in FIG. 4.

BEST MODE FOR CARRYING OUT THE INVENTION

FIG. 1 illustrates in perspective view a lagging segment embodying this invention. The segment is generally designated 10 and it consists of a metal plate 11 which includes a leading edge 12 and two parallel side edges 14, only one of which is shown. The leading edge 12 is interrupted by a number of recesses 13 which cause the leading edge 12 to be discontinuous and to lie at the outer edges of protruding portions 15. The plate 11 in this embodiment is bent in an arc having the radius of the face of pulley wheel 40 to which the segment is to be attached. The circumferential direction of the segment is from right to left and parallel with side edges 14. The length of the protruding portions 15 in the transverse direction, perpendicular to the side edges and the circumferential direction, is less than the length of the recessed 13 in that direction.

The segment illustrated in FIG. 1 also has a trailing edge 20 that is discontinuous and interrupted by recesses 21 which results in alternating protruding portions 22 and recesses 21 across the transverse direction of the trailing edge 20. The transverse length of protruding portions 22 in the trailing edge is the same as the transverse length of protruding portions 15 in the leading edge and the transverse length of recesses 21 and the trailing edge is the same as the transverse length of recesses 13 in the leading edge. The protrusions 15 are circumferentially aligned with recesses 21, and as a result that protrusions 22 are circumferentially aligned with recesses 13.

The upper face of plate 11 has elastomer 27 bonded to it and the elastomer 27 has a leading portion 28 and a trailing portion 30. The leading portion 28 is circumferentially spaced very closely to the bottom of recesses 13. As a result, protruding portions 15 extend beyond the leading portion 28 of elastomer 27 by slightly more than the depth of recess 13. If segments are to be attached to the pulley face by being welded to it, protrusions 15 should be at least 15 mm long to protect elastomer from welding heat and they will normally be about 25 millimeters long.

The elastomer 27 is selected in accordance with known principals to have the proper degree of softness and to be deep enough to provide the required traction to drive or to support a conveyor belt. Tread 31 may be cut into the elastomer to improve its traction with respect to a conveyor belt, all as is known to the art.

FIGS. 2 and 3 illustrate how two adjacent segments such as illustrated in FIG. 1 are attached to a pulley face. The arrow 41 illustrates the direction of rotation of the pulley. With the pulley rotating in the direction of arrow 41, the segment shown farthest to the right in FIG. 2 will be the first to be attached to the pulley face by having a spot weld 33 connecting the end of tab 15 at the leading edge 12 to the pulley face. At least two spot welds at the ends of spaced protrusions 15 are used, and preferably each protrusion 15 is welded to the pulley face. That first segment will then be connected to the pulley face at its trailing edge by having spot welds 35 connecting the ends of protrusions 22 to the pulley face 40. The segment 10 is held tightly against the pulley face by means known to the art when welding is accomplished.

When the first segment is attached to the pulley face with spot welds at the ends of protrusions 15 and 22, the next adjacent segment, the one to the left in FIGS. 2 and 3, is installed by first inserting protrusions 15 into recesses 13 leaving approximately four millimeters of space illustrated as space 32. When so positioned spot welds 33 may be made at the ends of the protrusions 15 to connect the leading edges of the second segment to the pulley face. Although spot welds 33 are physically close to the elastomer 27, they are not in heat conducting relationship with elastomer 27 because of the air space 32 so that the heat of welding is dissipated and does not damage elastomer 27. Thus, spot weld 33 is not in physical contact with the bottom of recess 21 and the recess is heated only by radiation through the air space 32. The process described above is repeated with additional lagging segments until the entire pulley wheel is lagged. If worn segments are to be replaced, the worn segments are removed one or two at a time and replaced with new ones. Even a single segment made in accordance with this invention can be replaced because all welds at the ends of protrusions are separated from adjacent segments by an air space and all welds are made at the ends of protrusions.

It is evident from the foregoing that all welds are made between the metal plate 11 and the face of pulley 40 at a distance from elastomer 27 that will not cause damaging heat to be conducted to it. It is also evident that all welds made close to elastomer 27 are spaced from heat conducting plate 11 by an insulating air space. Thus, by the use of the protrusion and recess construction of the leading edges and the trailing edges of the lagging segments of this invention, the space between the elastomer portions of adjacent segments is reduced approximately by half of the space required for lagging segments made in accordance with the prior art.

Another embodiment of the invention is illustrated in FIGS. 4 and 5. The lagging segments are made with the same protrusion and recess construction but they are held to the face of pulley 40 by being held beneath clips 50 which are fastened to the pulley by bolts 51 which are in turn screwed into threaded holes 52. Bolts 51 easily pass through air space 32 and hold plate 50 to overlap the exposed portions of the metal plate 11 of both adjacent lagging segments. In the embodiment illustrated in FIGS. 4 and 5 the adjacent lagging segments can be mounted closer together than if mounted beneath a long, continuous strip extending laterally across the face of pulley 40 beneath which exposed portions of plate 11 about the length of protrusions 15 would extend from both lagging segments.

What is claimed is:

1. A lagging segment comprising a metal support plate, said support plate having parallel circumferential side edges, a leading edge running between said side edges, a trailing edge running parallel to said leading edge and an upper surface, an elastomeric layer bonded to said upper surface, a plurality of first recesses in said plate intersecting said leading edge, said first recesses forming a plurality of first spaced protruding portions extending beyond said elastomeric layer, said first recesses being longer in the direction between side edges than said first protruding portions, a plurality of second recesses in said plate intersecting said trailing edge, said second recesses forming a plurality of second protruding portions extending beyond said elastomer layer, said second recesses having the same length as said first recesses, and said second recesses being circumferentially aligned with said first protruding portions.

2. The segment of claim 1 wherein the difference in length between said recesses and said protruding portions is at least two millimeters.

3. The segment of claim 1 wherein the depth of said recesses is at least fifteen millimeters.

4. A method for mounting a plurality of lagging segments on a pulley, each of said lagging segments comprising a metal support plate having parallel circumferential side edges, a leading edge running between said side edges, a trailing edge running parallel to said leading edge and an upper surface, an elastomeric layer bonded to said upper surface, a plurality of first recesses in said plate intersecting said leading edge, said first recesses forming a plurality of first spaced protruding portions extending beyond said elastomeric layer, said first recesses being longer in the direction between side edges than said first protruding portions, a plurality of second recesses in said plate intersecting said trailing edge, said second recesses forming a plurality of second protruding portions extending beyond said elastomer layer, said second recesses having the same length as said first recesses and said second recesses being circumferentially aligned with said first protruding portions, said method comprising placing a lagging segment in contact with a face of said pulley surface with said leading edge positioned to lead said trailing edge in the direction of rotation of said pulley, fixing an outer edge of two first protruding portions to the face of said pulley, fixing an outer edge of two second protruding portions to the face of said pulley, placing another lagging segment in contact with the face of said pulley with the leading edge positioned to lead said trailing edge in the direction of rotation of said pulley and with the protruding portions of the leading edge of said other segment extending into the recesses of the trailing edge of said segment a distance less than the circumferential length of said second protruding portions, whereby an air space exists between the bottom of the recess of said segment and the leading edge of said other segment, fixing the outer edge of two first protruding portions of said other segment to said pulley face, and fixing the outer edge to second protruding portions of said other segment to said pulley face.

5. The method of claim 4 wherein said fixing is accomplished by welding.

6. The method of claim 5 wherein welds produced by said welding step on the protruding portion of said other segment do not encompass the recessed portion of said segment.

7. The method of claim 4 wherein said fixing is accomplished by holding said protruding portions between a clip and the face of said pulley.

8. The method of claim 7 wherein said clip is connected to said pulley by being bolted through said air space.

* * * * *